United States Patent

Nardella et al.

Patent Number: 5,585,002
Date of Patent: Dec. 17, 1996

[54] RECLAMATION OF POLLUTED WET SOILS

[75] Inventors: Alessandro Nardella; Raffaello Sisto, both of Rome, Italy

[73] Assignee: Eniricerche S.p.A., Milan, Italy

[21] Appl. No.: 551,337

[22] Filed: Nov. 1, 1995

[30] Foreign Application Priority Data

Nov. 24, 1994 [IT] Italy .................... MI94A2384

[51] Int. Cl.⁶ ............... B01D 11/04; B08B 3/08
[52] U.S. Cl. ............ 210/634; 210/770; 210/908; 210/909; 134/10; 134/25.1; 134/42
[58] Field of Search .................. 134/10, 12, 19, 134/25.1, 40, 42, 25.5; 210/768, 770, 771, 772, 774, 634, 908, 909

[56] References Cited

U.S. PATENT DOCUMENTS 3,254,959 6/1966 Fallgatter et al. .
4,606,774 8/1986 Morris .
4,662,948 5/1987 Weitzman .
4,801,384 1/1989 Steiner .
4,869,825 9/1989 Steiner .
4,975,198 12/1990 Steiner .

FOREIGN PATENT DOCUMENTS 0446975 9/1991 European Pat. Off. .
4026373 3/1992 Germany .

*Primary Examiner*—Robert Popovics
*Attorney, Agent, or Firm*—Oblon, Spivak, McClelland, Maier & Neustadt, P.C.

[57] ABSTRACT

The present invention relates to a process for treatment of soils polluted by high-boiling organic substances, such as petroleum, polynuclear aromatics and chloro-organic substances, which process uses an extractant with high dissolving power for the pollutant, and which improves the soil-extractant contact thanks to the addition of a minimal amount of a hydrophilic co-solvent.

10 Claims, 1 Drawing Sheet

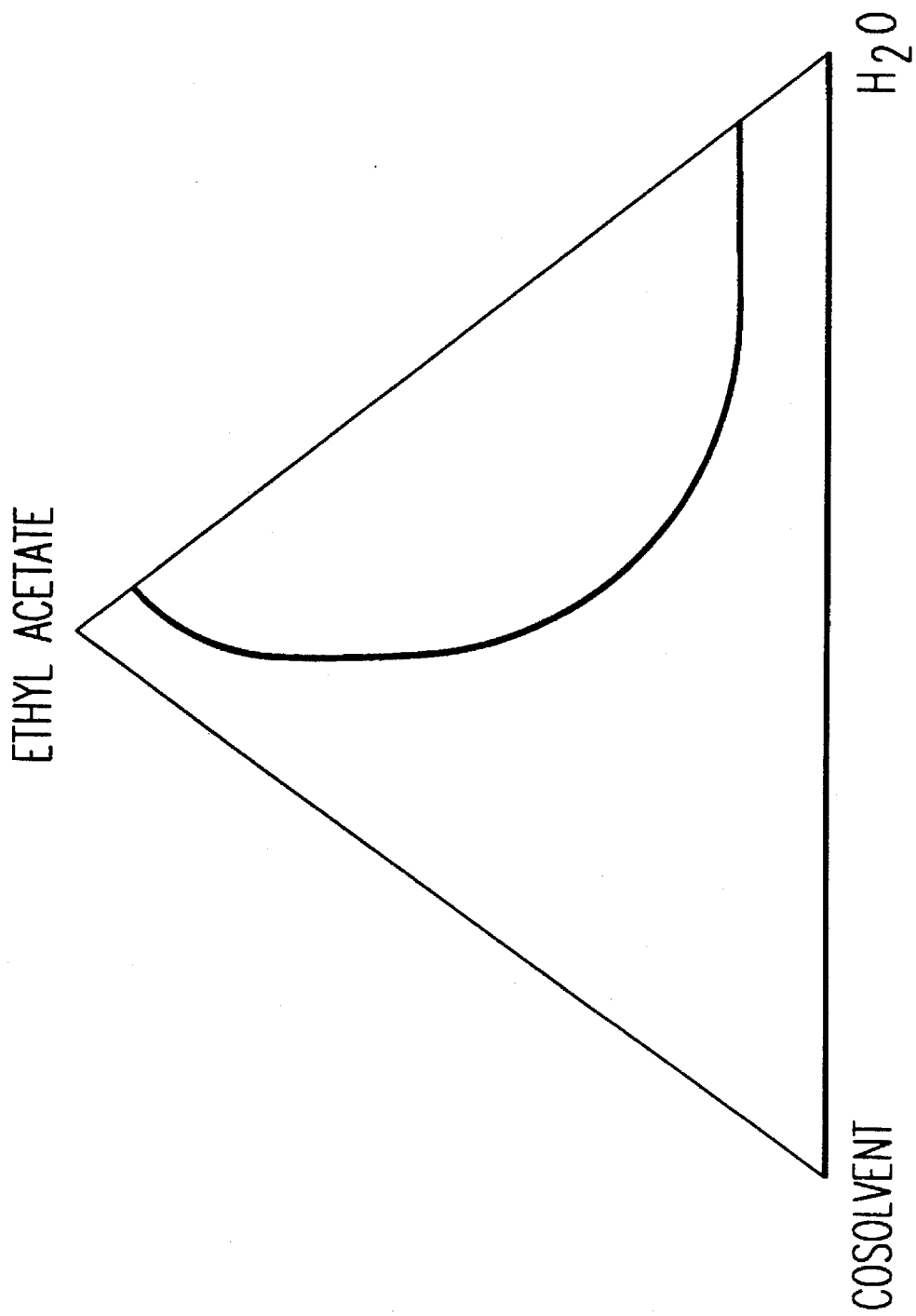

RECLAMATION OF POLLUTED WET SOILS

The present invention relates to a process for treatment of wet soils polluted by high-boiling organic substances, by means of a mixture of hydrophobic and hydrophilic solvents.

The problem of soils polluted by high-boiling organic pollutants, such as hydrocarbons, polynuclear aromatics, chloro-organic substances, is becoming more and more dramatic in industrialized Countries, not only in terms of actions to be carried out on soil and underground waters pollution, but also as regards the need for recovering surfaces for possible industrial and dwelling uses.

Another serious problem, typical of petroleum sector, is the treatment of drilling wastes before these are disposed of by being discharged to sea. One should think that in Italy approximately 14,000 $m^3$ of oil-polluted wastes deriving from off shore drilling must be disposed of on year basis.

The modalities of pollution, as well as the characteristics of soil concerned by pollution, may be very different from each other. These circumstances require that a wide range of solutions and possible actions are available.

Widely used is the technique of "soil washing", a term which encompasses washing techniques using only water, possibly with the addition of additives. Unfortunately, these techniques suffer from the drawback that they use large amounts of extractant agent and that the recovery of additives (surfactants) is generally difficult.

Other used processes are those which rely on use of solvents. Among these, a large number of patents can be cited in which the use is claimed of liquified $C_2$–$C_4$ hydrocarbons, supercritical fluids, methylene chloride, and so forth. However, polluted soils containing large amounts of $H_2O$ (>5% by weight) which make it difficult to treat the soil by means of the solvent extraction technique, because of the following reasons.

The pollutants generally are apolar or of poorly polar type: aliphatic hydrocarbons, polynuclear aromatic hydrocarbons, chloro-organic species, and so forth; as a consequence, the best solvents for such pollutants should be poorly polar or apolar. Furthermore, in order that the extraction of pollutants from soil is effective, it is necessary that the contact between the soil to be reclaimed and the extractant agent is as intimate as possible. This condition cannot easily be accomplished when apolar solvents are used: a wet soil ($H_2O$>5%) is easily mixed with polar solvents only.

We have solved now these problems by means of a process for treatment of polluted soils, which uses an extractant with high solvent capabilities for the pollutant and improves the soil-extractant contact thanks to the addition of a very small amount of a hydrophilic co-solvent.

In accordance therewith, the present invention relates to a process for separating high-boiling organic pollutants from a composition constituted by soil containing water in an amount comprised within the range of from 5% up to the threshold value of field capacity, and said high-boiling organic pollutants, which process comprises the steps of:

(a) bringing said composition into contact with an extractant mixture constituted by a solvent for said petroleum of fractions thereof and a polar co-solvent, with said solvent and co-solvent being selected and blended with each other in such a ratio that they can constitute one single liquid phase with water contained in the composition;

(b) separating the coarse fraction of soil from the liquid phase which contains the finer fraction of soil (c) separating the liquid phase from fine soil fraction;

(d) drying the coarse soil fraction from (b) step and the fine soil fraction from (c) step.

In the selection of solvent:cosolvent pair, the requirement should be kept into consideration of using products which are non-toxic (a small amount of them will anyway remain in the treated soil), volatile (hence, easy to be removed from soil), cheap and easily available.

Under preferred conditions, the solvent is ethyl acetate and the cosolvent is selected from acetone and acetic acid.

The optimal ratio of solvent:polar cosolvent, by weight, which makes it possible, by getting mixed water contained in soil, one single liquid phase to be formed, can be calculated by starting from a purposely generated phase chart. In this way, that extractant mixture is obtained which allows the best contact between soil and extractant to be accomplished with the minimal consumption of polar solvent. The ratios, by weight, of wet soil to extractant blend may vary within a range, but, under preferred conditions, such a ratio is of 1:1. Also the extraction step (a) can be carried out repeatedly, if so necessary.

The separation according to (b) and (c) steps can be carried out by sieving or by using a hydrocyclone; when only small amounts have to be handled, a centrifuge can be used.

The (d) step drying can be carried out by using a dryer or desiccator, a spray dryer, or by means of still other techniques known form the prior art.

By means of the present process, the use of a hydrophilic/hydrophobic solvent system having the proper composition makes it possible to obtain results which are better than achieved by a single-component system, and is furthermore independent from pollution "history", i.e. from, e.g., whether the pollution of soil took place before, or after, a rain.

The following examples are reported for a better understanding of the invention, and shall not be construed as being limitative thereof.

EXAMPLES 1–5

A system constituted by ethyl acetate (solvent), acetone (cosolvent) and water can be represented by the (isothermal) ternary phase chart represented in FIG. 1, in which a non-miscibility region is present owing to the partial mutual miscibility of solvent and $H_2O$. Systems having a composition falling inside said non-miscibility region will undergo spontaneous phase separation, yielding two phases; those systems the composition of which is out of said non-miscibility region will constitute, on the contrary, one single phase.

Assuming that $H_2O$ contained in soil can be regarded as being free water, the minimum content of acetone to be added to ethyl acetate in order to obtain one single phase while keeping the ratio of soil:extractant =1:1 by weight, is determined from the triangular chart, by finding out the threshold composition of non-miscibility region (referred to, herein in the following, as "system percent"). In order to select the solvent mixture, knowing the moisture level of a soil is enough, without that the type of soil, whether sandy or argillaceous, has to be taken into consideration.

In Table 1, the suitable ethyl acetate:acetone mixtures are shown for various percent levels of water in soil, and for a ratio of soil:extractant (S/E) of 1:1.

A plurality of samples of sandy soil to be reclaimed, each of which has a total weight of 100 g, are prepared in the laboratory by operating according to the following procedure.

To 89 g of previously dried sandy soil, 10 g of H$_2$O is added, the mixture is homogenized and is allowed to equilibrate for about 4 hours. An amount of 1 g of (Arabian Light) crude petroleum is then added, the mixture is homogenized and is allowed to equilibrate overnight (about 16 hours).

The soil is subdivided into five equal samples with a water content of 10%, and are used to carry out single-step reclamation tests with a soil:extractant ratio of 1:1 by weight, by using the following different solvent:cosolvent systems:
1=acetone
2=petroleum ether
3=ethyl acetate
4=ethyl acetate/acetic acid
5=ethyl acetate/acetone The (b) separation step is carried out by vibrational sieving with mesh opening of 106 microns, and the (c) separation step is carried out by centrifugation at 700×g. The solid fractions are oven dried at 105° C. for 2 hours.

The results are reported in Table 2 in which with "R" the removal efficiency is indicated, as expressed as the ratio, multiplied times 100, of the difference between initial pollution (Ii) and end pollution (If), to initial pollution.

The formula is as follows:

$$R=(Ii-If)/Ii\times 100$$

With "Res" the residual pollution of soil is indicated, as expressed as % of dry substance, which was obtained by extraction with methylene chloride in a Soxhlet extractor, of a portion of the sample submitted to the reclaiming treatment.

Whenever possible, the residual pollution was determined of both soil fractions, i.e., the coarse one (>106 microns), and the fine one (<106 microns); in some cases, only the value relevant to the coarse fraction exists, because the vibrational sieving of soil did not allow the fine fraction to be separated. Such a phenomenon occurs when polar solvents are used which, by not establishing a good contact with the wet surface of soil particles, because these to remain mutually sticking (aggregates).

On the third line of the Table, the value of weight-average pollution of treated sample is reported.

EXAMPLES 6–10

A series of samples of sandy soil to be reclaimed, each with a total weight of 100 g, is prepared in the laboratory by operating according to the same procedure as followed for Examples 1–5, with the difference that the soil is first polluted and then humidified.

The results obtained after the treatment are reported in Table 3. The considerable difference in petroleum ether removal efficiency according to the pollution modality should be underlined.

EXAMPLES 11–15

A series of samples of argillaceous soil to be reclaimed, each with a total weight of 100 g, is prepared in the laboratory, according to the following procedure:

(a) 74 g of previously dried argillaceous soil is admixed with 25 g of H$_2$O, the mixture is homogenized and is allowed to equilibrate for some hours (about 4 hours);

(b) thereafter, 1 g of (Arabian Light) crude petroleum is added and the mixture is allowed to equilibrate overnight (about 16 hours).

The results obtained after the treatment are reported in Table 4.

EXAMPLES 16–20

A series of samples of sandy soil to be reclaimed, each with a total weight of 100 g, are prepared in the laboratory by operating according to the same procedure as followed for Examples 11–15, with the difference that the soil is first polluted and then humidified.

The results obtained after the treatment are reported in Table 5.

We wish to underline that in this case too, the removal effect obtained from the treatments with the blend is independent from pollution history, differently from single-solvent treatments, in particular when petroleum ether is used.

EXAMPLE 21

A sample of sandy soil to be reclaimed is treated as follows.

An amount of 94 g of previously dried soil is admixed with 1 g of phenanthrene (a polynuclear aromatic hydrocarbon) dissolved in 10 g of methylene chloride. The resulting sample is homogenized and methylene chloride is caused to evaporate off in an air circulation oven at 50° C. for 3 hours. Thereafter, 5 g of water is added, the mixture is homogenized and is allowed to equilibrate overnight.

The sample is submitted to reclamation treatment according to the same process as disclosed for Examples 1–5, with the only difference that the washing step is repeated three times, each time with fresh solvent constituted by the 95:5 ethyl acetate:acetic acid.

The results are reported in Table 6.

EXAMPLE 22

A sample of argillaceous soil is treated in the same way as in Example 21.

The results are reported in Table 7.

TABLE 1

| % H$_2$O in soil | System % | | | Solvent composition (%) | |
|---|---|---|---|---|---|
| | H$_2$O | Ethyl acetate | Acetone | Ethyl acetate | Acetone |
| 4.0 | 3.8 | 83.5 | 12.7 | 86.8 | 13.2 |
| 6.0 | 5.7 | 72.0 | 22.3 | 76.3 | 23.7 |
| 8.0 | 7.4 | 65.5 | 27.1 | 70.7 | 29.3 |
| 10.0 | 9.1 | 59.5 | 31.4 | 65.5 | 34.6 |
| 15.0 | 13.0 | 50.0 | 37.0 | 57.5 | 42.5 |
| 20.0 | 16.7 | 45.0 | 38.3 | 54.0 | 46.0 |
| 25.0 | 20.0 | 42.0 | 38.0 | 52.5 | 47.5 |
| 30.0 | 23.1 | 38.5 | 38.4 | 50.1 | 50.0 |
| 35.0 | 25.9 | 35.5 | 38.6 | 47.9 | 52.1 |
| 40.0 | 28.6 | 31.0 | 40.4 | 43.4 | 56.6 |

TABLE 2

|  | Acetone | | Petroleum ether | | Ethyl acetate | | Ethyl acetate/ Acetic acid | | Ethyl acetate/ Acetone | |
| --- | --- | --- | --- | --- | --- | --- | --- | --- | --- | --- |
|  | Res (%) | R (%) | Res. (%) | R (%) | Res. (%) | R (%) | Res. (%) | R (%) | Res. (%) | R (%) |
| >106 μm | 0.09 | 92.10 | 0.26 | 76.55 | 0.10 | 90.92 | 0.08 | 93.20 | 0.08 | 94.16 |
| <106 μm | 1.29 | −14.84 | | | | | 0.48 | 56.85 | 0.43 | 68.32 |
| Average value | 0.18 | 83.54 | 0.28 | 76.55 | 0.10 | 90.92 | 0.12 | 89.57 | 0.09 | 93.21 |

TABLE 3

|  | Acetone | | Petroleum ether | | Ethyl acetate | | Ethyl acetate/ Acetic acid | | Ethyl acetate/ Acetone | |
| --- | --- | --- | --- | --- | --- | --- | --- | --- | --- | --- |
|  | Res (%) | R (%) | Res. (%) | R (%) | Res. (%) | R (%) | Res. (%) | R (%) | Res. (%) | R (%) |
| >106 μm | 0.05 | 95.51 | 0.07 | 93.81 | 0.06 | 94.86 | 0.07 | 92.87 | 0.04 | 96.79 |
| <106 μm | 1.10 | 2.02 | | | | | 0.46 | 54.13 | 0.13 | 90.61 |
| Average value | 0.13 | 88.14 | 0.07 | 93.81 | 0.06 | 94.86 | 0.11 | 89.32 | 0.05 | 96.59 |

TABLE 4

|  | Acetone | | Petroleum ether | | Ethyl acetate | | Ethyl acetate/ Acetic acid | | Ethyl acetate/ Acetone | |
| --- | --- | --- | --- | --- | --- | --- | --- | --- | --- | --- |
|  | Res (%) | R (%) | Res. (%) | R (%) | Res. (%) | R (%) | Res. (%) | R (%) | Res. (%) | R (%) |
| >106 μm | 0.36 | 73.04 | 0.58 | 56.76 | 0.33 | 75.94 | 0.21 | 84.59 | 0.15 | 88.87 |
| <106 μm | 0.53 | 60.91 | | | | | | | 0.13 | 90.23 |
| Average value | 0.44 | 67.59 | 0.58 | 56.76 | 0.33 | 75.94 | 0.21 | 84.59 | 0.14 | 89.93 |

TABLE 5

|  | Acetone | | Petroleum ether | | Ethyl acetate | | Ethyl acetate/ Acetic acid | | Ethyl acetate/ Acetone | |
| --- | --- | --- | --- | --- | --- | --- | --- | --- | --- | --- |
|  | Res (%) | R (%) | Res. (%) | R (%) | Res. (%) | R (%) | Res. (%) | R (%) | Res. (%) | R (%) |
| >106 μm | 0.37 | 72.32 | 0.15 | 89.26 | 0.22 | 83.68 | 0.19 | 85.66 | 0.22 | 83.49 |
| <106 μm | 0.29 | 78.28 | | | | | | | 0.12 | 90.96 |
| Average value | 0.35 | 74.03 | 0.15 | 89.26 | 0.22 | 83.68 | 0.19 | 85.66 | 0.19 | 85.75 |

TABLE 6

|  | Res. (ppm) | R (%) |
| --- | --- | --- |
| >106 μm | 9 | 99.10 |
| <106 μm | 40 | 95.89 |
| Average value | 11 | 98.90 |

TABLE 7

|  | Res. (ppm) | R (%) |
| --- | --- | --- |
| >106 μm | 38 | 96.24 |
| <106 μm | 39 | 96.13 |
| Average value | 38 | 96.20 |

We claim:

1. A process for separating high-boiling organic pollutants from a soil composition, comprising:

(a) extracting the soil composition containing water in an amount of from 5% by weight up to the threshold value of the field capacity and constituted of particles of varying sizes, said organic pollutants being selected from the group consisting of apolar or poorly polar aliphatic hydrocarbons, polynuclear aromatic hydrocarbons and chloro-organic compounds, with an extractant mixture consisting of a volatile ester solvent for said pollutants and a hydrophilic, volatile, polar cosolvent, said ester solvent and cosolvent being selected and blended with each other in a ratio which forms one single liquid phase with water present in the soil composition;

(b) separating a coarse particle size fraction from said liquid phase which contains a finer size soil particle fraction and said pollutants;

(c) separating the fine particle size fraction from the liquid phase; and (d) drying the coarse particle size fraction of step (b) and the fine soil size fraction of step (c).

2. The process of claim 1, wherein said pollutant is petroleum or petroleum fractions.

3. The process of claim 1, wherein said pollutant is a polynuclear aromatic material.

4. The process of claim 3, wherein the polynuclear aromatic material is phenanthrene.

5. The process of claim 1, wherein said pollutant is a chloro-organic material.

6. The process of claim 1, wherein said ester solvent is ethylacetate.

7. The process of claim 1, wherein said cosolvent is acetone.

8. The process of claim 1, wherein said cosolvent is acetic acid.

9. The process of claim 1, wherein the water/pollutant containing soil composition and the solvent extractant mixture are present in a ratio of 1:1 by weight.

10. The process of claim 1, wherein the pollutant/water soil composition contains oil-polluting waste in soil material obtained from petroleum bore drilling.

* * * * *